Dec. 11, 1951

E. E. MOTT 2,578,367

TELEPHONE MOUNTING

Filed July 28, 1949

3 Sheets-Sheet 1

INVENTOR
E. E. MOTT
BY [signature]
ATTORNEY

Dec. 11, 1951

E. E. MOTT

TELEPHONE MOUNTING 2,578,367

Filed July 28, 1949

3 Sheets-Sheet 2

INVENTOR
E. E. MOTT
BY [signature]
ATTORNEY

INVENTOR
E. E. MOTT
BY
[signature]
ATTORNEY

Patented Dec. 11, 1951

2,578,367

UNITED STATES PATENT OFFICE 2,578,367

TELEPHONE MOUNTING

Edward E. Mott, Upper Montclair, N. J., assignor to Bell Telephone Laboratories, Incorporated, New York, N. Y., a corporation of New York Application July 28, 1949, Serial No. 107,300

8 Claims. (Cl. 181—31)

This invention relates to telephone substation apparatus and more particularly to hand telephone mountings of the type, such as disclosed in the application, Serial No. 49,570, filed September 16, 1948 of C. L. Krumreich, now Patent No. 2,566,840, issued September 4, 1951, having substation instrumentalities including a station signal therein.

One general object of this invention is to provide an improved station signal in telephone substation apparatus. More specifically, one object of this invention is to provide, in a hand telephone mounting, a loudspeaker type station signal device having a high output level over a band of low frequencies and efficiently responsive at higher frequencies to produce a harmonically enriched calling signal.

In one illustrative embodiment of this invention, a hand telephone mounting comprises a housing and a base and substation instrumentalities including a loudspeaker type station signal mounted on the base, the station signal including an electro-acoustic translating unit and a horn coupled thereto and having its mouth opposite an apertured portion in the base. The base has thereon supporting members or feet which space the mounting from the surface, such as the top of a desk, table or shelf, upon which the mounting is supported. Such surface and the base in combination define a passageway constituting an extension of the horn.

Because of limitation of the size of the mounting and the small space available within it, the horn of the station signal necessarily is of small dimensions. Consequently, the mouth area and length of the horn which can be employed are limited and inherent restriction obtains upon the low frequency response which can be realized by design of the horn alone.

In accordance with one feature of this invention, the housing is constructed and arranged to define an acoustic network associated with the station signal and effective to substantially enhance the low frequency response of the signal and produce a substantially optimum response over desired frequency ranges. More specifically, the housing is provided with an apertured portion spaced from the apertured portion in the base opposite the horn mouth and constituting an acoustic impedance having a mass reactance component which together with the low stiffness of the air in the chamber within the housing is resonant at a preassigned low frequency. Also the housing and base are associated to provide a restricted opening spaced from both the apertured portions and serving to regulate the distribution between these two portions of the flow of sound from the station signal. Further, in accordance with a feature of this invention, the horn is associated with the base to provide another restricted opening, this opening having prescribed acoustic impedance such as to effect a broadening of the fundamental resonance of the acoustic system including the loudspeaker and to increase the efficiency of this system.

The invention and the above-mentioned and other features thereof will be understood more clearly and fully from the following detailed description with reference to the accompanying drawing in which.

Figure 1:
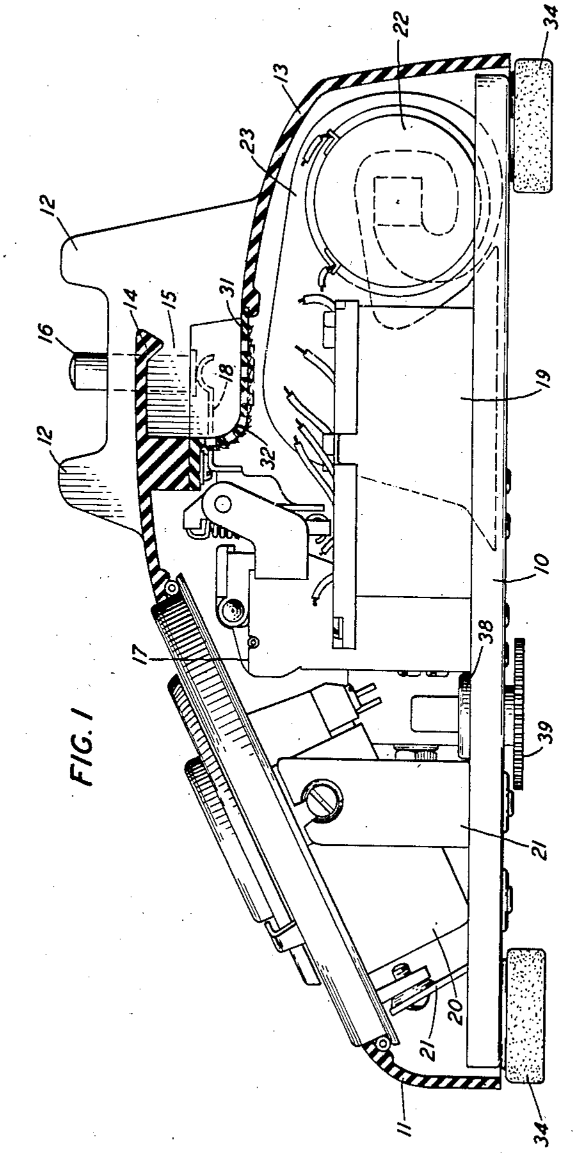
Fig. 1 is a side elevational view partly in section of a hand telephone mounting illustrative of one embodiment of this invention.

Referring now to the drawings, the hand telephone mounting illustrated in Fig. 1 comprises a rectangular base 10 and a housing fitted over the base and having a sloping front wall 11, side walls each of which terminates in a pair of tines 12 to define a cradle for receiving the hand telephone, and a rear wall 13 the upper portion of which extends inwardly between parts of the side walls. The rear wall 13 has therein a multi-apertured insert 31, covered with a protective fabric 32 for excluding foreign particles, extending below an overhanging portion 14 of the front wall in the cradle part of the mounting and defining a fingers receiving recess 15 such as disclosed in Patent 2,096,046 granted October 19, 1937 to J. J. Kuhn and G. L. Lum. Extending into the housing and between each pair of tines 12 is a plunger 16 for actuating a contact spring assembly 17, the plungers and springs being coupled by a lever structure 18.

Mounted upon the base 10 are the substation instrumentalities, such as a unitary electrical network element 19 and a dial 20, the latter being supported from the base by brackets 21. Also mounted upon the base 10 is a loudspeaker type station signal which comprises an electroacoustic transducer 22 and a horn 23.

Figure 3:
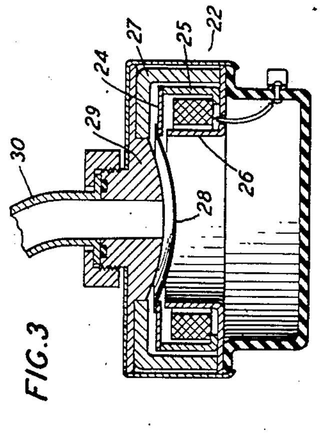
Fig. 3 is a sectional view of the electroacoustic translating unit included in the station signal in the device shown in Fig. 1.

The transducer 22, which may be of the construction disclosed in the application, Serial No. 755,397, filed June 18, 1947 of R. E. Wirsching, now Patent No. 2,506,624, issued May 9, 1950, comprises, as shown in Fig. 3, an annular magnetic armature 24 seated at its periphery upon a support 25 and having its inner margin between the juxtaposed poles of an annular pole-piece 26 and cup-shaped magnet 27. The armature mounts a diaphragm member 28, for example dome-shaped as illustrated in Fig. 3, having in juxtaposition thereto a throat member 29 to which the throat section 30 of the horn 23 is coupled.

Figure 4:
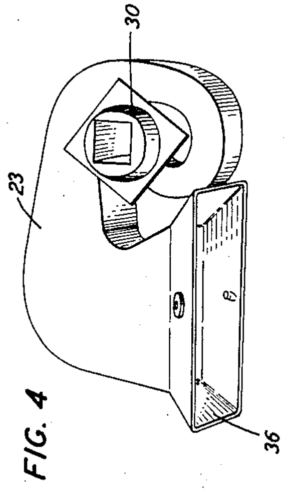
Fig. 4 is a perspective view of the horn included in this station signal.

The horn 23, as illustrated in Fig. 4, is of folded form and of generally rectangular cross-section. Advantageously, the horn passageway increases in area exponentially from the throat to the mouth thereof. The parameters of this passageway are correlated in ways known in the art so that the horn is capable of transmitting sound waves efficiently within a prescribed band of frequencies.

Figure 2:
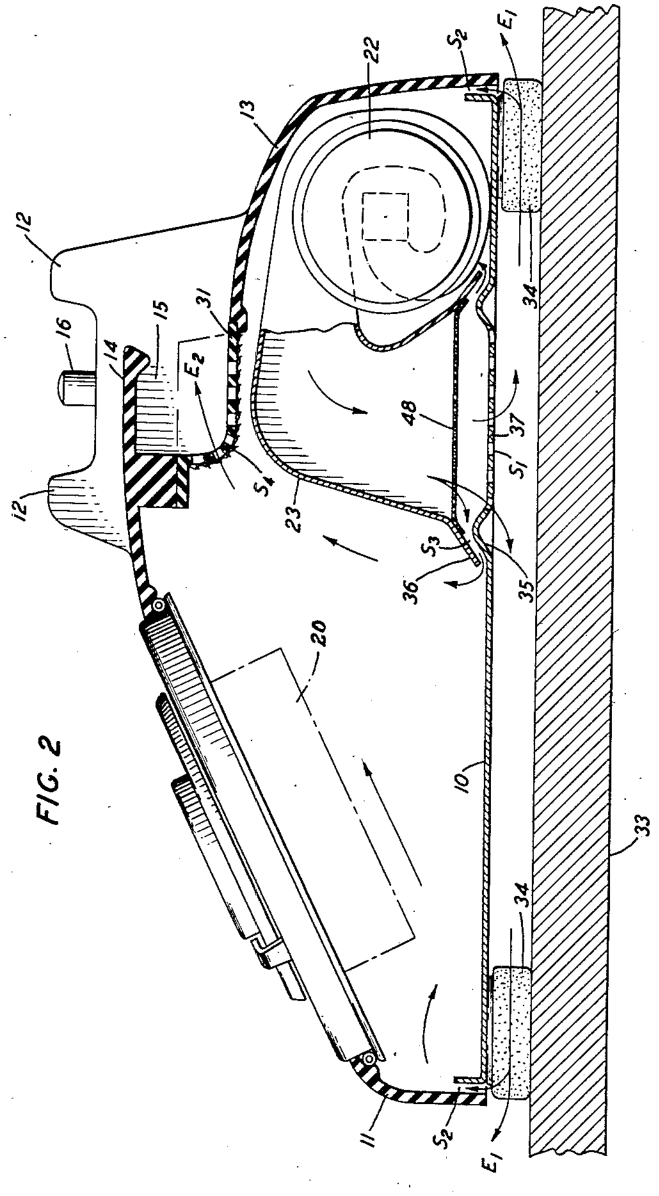
Fig. 2 is a view similar to Fig. 1 with certain of the substation instrumentalities omitted and details of the acoustic network associated with the station signal shown.

As illustrated in Fig. 2, in use the mounting is supported upon a desk, table or shelf 33 being spaced from the upper surface thereof by legs 34 affixed to the base 10. The base 10 is provided with an annular raised portion 35 in juxtaposition to a bell part 36 at the mouth of the horn 23 and spaced therefrom to provide an annular passageway. The mouth of the horn is opposite a multiapertured portion 37 in the base 10 and has extending thereacross a membrane 48, for example of polyethylene for preventing ingress of foreign particles into the horn and to the transducer 22.

The support 33 and base 10 define a passageway which may be considered as an extension of the horn 23, the dimensions of the passageway being made such advantageously that the transverse area thereof increases exponentially in the same manner as the passageway in the horn. A portion of the sound waves propagated by the horn 23 emanate through the apertures $S_1$ in the base portion opposite the mouth of the horn and these waves pass either to the atmosphere by way of the exit opening indicated at $E_1$ or through a restricted passageway $S_2$ in the interior of the housing, the passageway $S_2$ extending all around the base 10 and being defined by the flange on the base and the juxtaposed wall of the housing. Another portion of the sound waves traversing the horn pass into the interior of the housing through the annular passageway $S_3$ defined by the juxtaposed portions 35 and 36 of the base and horn respectively and thence outwardly through the apertures $S_4$ in the insert 31 as indicated at exit $E_2$.

The passageways $S_2$, $S_3$ and $S_4$ together with the volume of air within the housing constitute an acoustic network coupled to the horn 23. The effect of the elements of this network will be understood most readily from a consideration of Fig. 5. In this figure, curve A depicts the output of the loudspeaker station signal as measured on an axis normal to the top surface of the support 33 and with the passageways $S_2$, $S_3$ and $S_4$ closed. The curve B portrays the response with the passageway $S_3$ closed and the passageways $S_2$ and $S_4$ open. It will be noted that as indicated by curve B the effect of the passageways $S_2$ and $S_4$ is to substantially enhance the response at the low frequency end of the range and to make the response at higher frequencies more uniform. Specifically, the enhancement of the response at the low frequencies results from the resonance of the mass of air in the passageway $S_4$ with the stiffness of the chamber within the housing, and the passageway $S_2$ functions to regulate the distribution of the flow of sound between the outlets $E_1$ and $E_2$. At the lower frequencies the enhanced response is due predominantly to the passageway $S_4$. At the higher frequencies, because of the impedance introduced by the passageway $S_2$, the major portion of the sound output is by way of the opening $E_1$.

Figure 5:
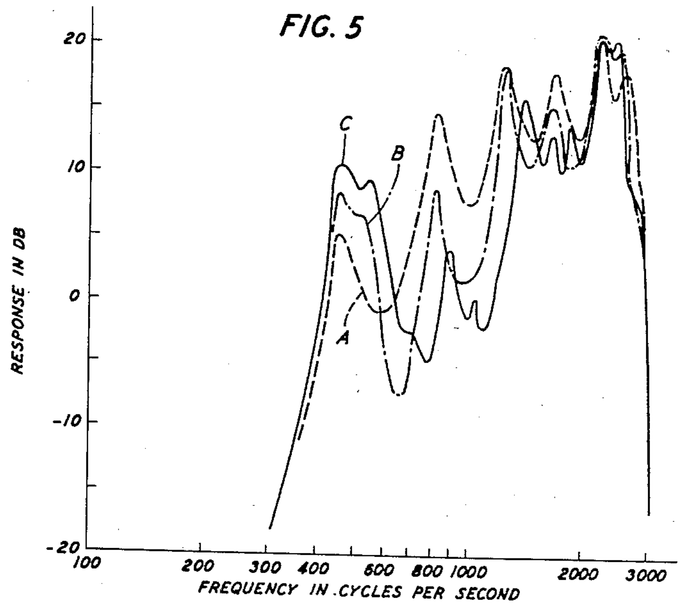
Fig. 5 is a graph illustrating typical response characteristics of station signals constructed in accordance with this invention.

Curve C in Fig. 5 illustrates the effect of the passageway $S_3$. Particularly, it will be noted that this passageway results in further enhancement of the response at the low frequency end of the range, a broadening of the fundamental resonance and a smoothing of the response at the high frequency end of the range.

The improved response obtained by the several passageways above noted will be dependent, of course, in any particular case upon the specific parameters of these passageways. In a typical and illustrative device wherein the base 10 was approximately 7.20 inches by 4.77 inches and the loudspeaker unit was designed to have a resonance at about 500 cycles the improvements depicted by curves B and C in Figs. 5 are realized with the passageway $S_2$ $\frac{5}{32}$ inch wide by $\frac{5}{16}$ inch long, the passageway $S_3$ $\frac{1}{16}$ inch wide by $\frac{3}{8}$ inch long by 7.20 inches in circumferential length, the passageway $S_4$ constituted by 24 to 27 quarter-inch diameter holes in the insert 31, and a volume of 831 cc. for the chamber within the housing.

Figure 6:
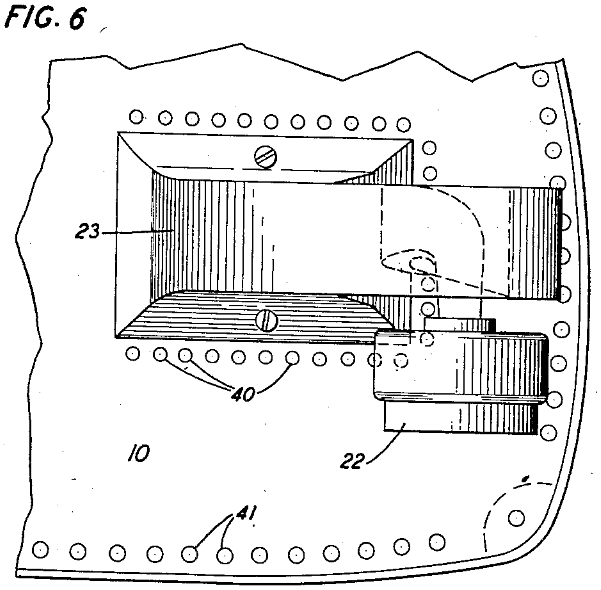
Fig. 6 is a fragmentary plan view illustrating a modification of the embodiment of this invention shown in Fig. 1.

In the embodiment of this invention illustrated in Fig. 6, the mouth of the horn bears against the base 10 opposite the apertured portion 37 therein and the housing 11 is fitted around the peripheral flange on the base 10. The equivalent of the passageway $S_3$ in Fig. 2 is provided by a multiplicity of apertures 40 in the base 10 and adjacent the bell portion 36 of the horn. The equivalent of the passageway $S_2$ is provided by a second multiplicity of apertures 41 in the base 10 and adjacent the periphery thereof.

The intensity of the signal produced by the loudspeaker may be regulated as by a rheostat 38 in series with the signal coil of the transducer 22 and adjustable by a finger wheel 39 adjacent and below the base 10. Alternatively, the signal intensity may be controlled by the provision of a shutter over the apertured portion 37 of the base 10.

Although specific embodiments of this invention have been shown and described, it will be understood that they are but illustrative and that various modifications may be made therein without departing from the scope and spirit of this invention.

What is claimed is:

1. A telephone mounting comprising a base having an apertured portion, a housing on said base having an apertured portion spaced from said first apertured portion, a loudspeaker station signal device within said housing and including a horn having its mouth opposite and parallel to said first apertured portion, and means defining a restricted acoustic passageway between the interior and exterior of said housing adjacent the periphery of said base.

2. A telephone mounting in accordance with claim 1 comprising means defining a second restricted acoustic passageway coupling the mouth of said horn to the interior of said housing.

3. A telephone mounting comprising a base having an apertured portion, a housing on said base, a loudspeaker station signal device within said housing and including a horn having its mouth opposite, parallel to and encompassing said first apertured portion, and means defining an acoustic network coupled to said horn for enhancing the low frequency response of said station signal device, said means including an apertured member in a wall of said housing and having acoustic mass reactance resonant with the air chamber within said housing at the low frequency end of the range of response of said station signal.

4. A telephone mounting comprising a base having an apertured portion, a housing on said base having an apertured portion spaced from said first apertured portion, a loudspeaker station signal device within said housing and including a horn having its mouth opposite and parallel to said first apertured portion, said housing having a portion encompassing said base and spaced therefrom to define a restricted acoustic passageway.

5. A telephone mounting in accordance with claim 4 wherein the mouth of said horn is in proximity to the inner surface of said base and spaced therefrom to define a second restricted acoustic passageway.

6. A telephone mounting comprising a base having an apertured portion, a housing on said base having an apertured portion spaced from said first apertured portion, a loudspeaker station signal device within said housing and including a horn having its mouth opposite and parallel to said first apertured portion, said housing being fitted to the periphery of said base and said base having therein a plurality of apertures adjacent its periphery.

7. A telephone mounting in accordance with claim 6 wherein the mouth of said horn bears against the inner surface of said base and said base has therein a plurality of apertures adjacent and outside of the periphery of said mouth.

8. A telephone mounting comprising a base having an apertured portion, support means on the exterior of said base, a housing encompassing said base and having its inner wall spaced from the periphery thereof to define a restricted acoustic passageway, said housing including an apertured wall portion remote from said base and defining acoustic mass resonant at a prescribed frequency with the air chamber within said housing, and a loudspeaker station signal device within said housing and including a horn having its mouth opposite and parallel to said first apertured portion, said base and horn having juxtaposed spaced portions defining a second restricted acoustic passageway coupling said chamber to said mouth, and said prescribed frequency being within the response range of said station signal device.

EDWARD E. MOTT.

REFERENCES CITED

The following references are of record in the file of this patent:

UNITED STATES PATENTS

| Number | Name | Date |
|---|---|---|
| 2,392,321 | Hersey | Jan. 8, 1946 |
| 2,441,425 | Lawrence | May 11, 1948 |